(12) United States Patent
Lee

(10) Patent No.: US 6,943,301 B2
(45) Date of Patent: Sep. 13, 2005

(54) WILDLIFE GUARD PLACEMENT TOOL

(75) Inventor: Lon G. Lee, Waxahachie, TX (US)

(73) Assignee: Basic Resources, Inc., Dallas, TX (US)

( * ) Notice: Subject to any disclaimer, the term of this patent is extended or adjusted under 35 U.S.C. 154(b) by 0 days.

(21) Appl. No.: 10/917,571

(22) Filed: Aug. 13, 2004

(65) Prior Publication Data

US 2005/0034884 A1 Feb. 17, 2005

Related U.S. Application Data

(60) Provisional application No. 60/495,379, filed on Aug. 15, 2003.

(51) Int. Cl.$^7$ .......................... H01B 17/00; B25B 23/16
(52) U.S. Cl. ................... 174/138 R; 174/5 R; 29/278; 81/3.8; 81/53.1; 294/19.1; 269/3
(58) Field of Search .................. 174/1, 5 R, 40 R, 174/45 R, 46, 70 A, 135, 138 R; 29/235, 241, 278; 81/3.8, 53.1; 269/1, 3, 6, 45; 294/19.1

(56) References Cited

U.S. PATENT DOCUMENTS

| | | | |
|---|---|---|---|
| 1,244,339 A | | 10/1917 | Johnson. Jr. |
| 1,704,491 A | * | 3/1929 | Thompson .................. 294/19.1 |
| 2,352,686 A | | 7/1944 | Broadbooks ................... 81/53 |
| 3,473,837 A | * | 10/1969 | Goodman ..................... 29/278 |
| 4,110,943 A | | 9/1978 | Carlson ........................ 52/101 |
| 4,906,801 A | | 3/1990 | Beasley ....................... 174/5 R |
| 5,564,852 A | | 10/1996 | Maxwell et al. .............. 403/97 |
| 5,593,196 A | | 1/1997 | Baum et al. ................ 294/19.1 |
| 5,648,641 A | | 7/1997 | Guthrie ....................... 174/139 |
| 5,650,594 A | | 7/1997 | Urnovitz ..................... 174/139 |
| 5,794,495 A | | 8/1998 | Anderson .................... 81/53.1 |
| 6,382,611 B1 | | 5/2002 | Ramer ......................... 269/238 |
| 6,453,775 B1 | | 9/2002 | Dietrich et al. .............. 81/53.1 |
| 6,473,953 B1 | | 11/2002 | Portnoff ........................ 29/241 |
| 6,474,197 B1 | | 11/2002 | Browen et al. ............... 81/3.8 |
| 6,483,060 B1 | * | 11/2002 | Taylor ......................... 81/53.1 |
| 6,642,464 B1 | * | 11/2003 | Taylor ......................... 81/53.1 |
| 6,823,631 B2 | * | 11/2004 | Homer et al. ............. 174/40 R |
| 2003/0140735 A1 | | 7/2003 | Weaver et al. | |

OTHER PUBLICATIONS

3M Electrostatic Animal Guard (formerly the Guthrie Guard) instruction sheet, 1998, pp. 1–4, 78–8121–1101–7(c); 3M Electrical Products Division, Austin, Texas.

Telescopic Hot Sticks, pp. 1–4; located at http://www.hfg-p.com/images/catalog/A–1.gif; dated Jan. 10, 2002.

Critter Guard, Pole Guard, article located at internet website http://www.critterguard.org/pole.htm, 2 pgs.

Critter Guard, Line Guard, article located at internet website http://www.critterguard.org/line.htm, 2 pgs.

* cited by examiner

*Primary Examiner*—Chau N. Nguyen
*Assistant Examiner*—Adolfo Nino
(74) *Attorney, Agent, or Firm*—Hunton & Williams LLP

(57) ABSTRACT

A wildlife guard placement tool for installing a wildlife protection guard on an insulator of an elevated, electrical power distribution system has been provided that includes a first end, a second end, an opening, a near side, and a far side with a slot formed therein. The opening and the slot are positioned such that a placement tab of the wildlife protection guard can be received into the opening and out through the slot. Additionally, a method for placement of a wildlife protection guard on an insulator of an elevated electrical power distribution system has been provided.

22 Claims, 8 Drawing Sheets

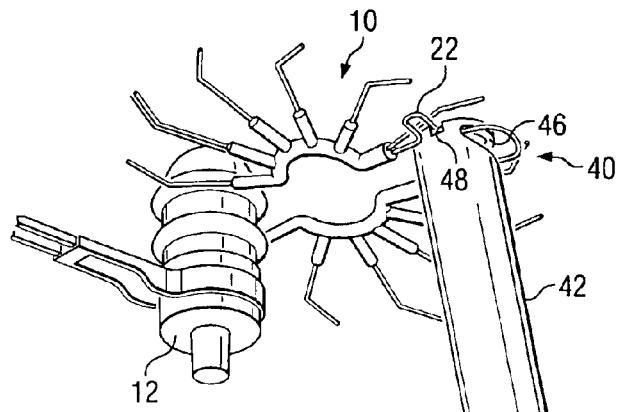
*FIG. 17*
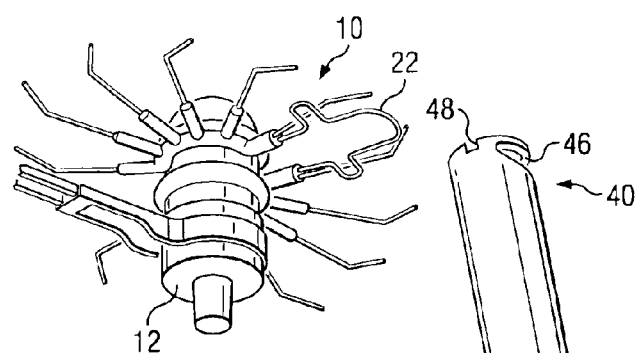
*FIG. 18*
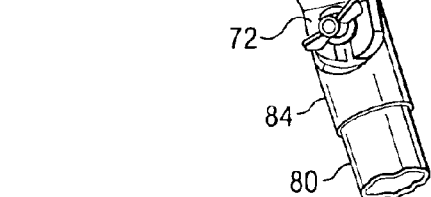
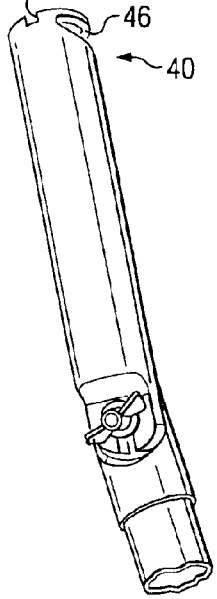

WILDLIFE GUARD PLACEMENT TOOL

CROSS-REFERENCE TO RELATED APPLICATIONS

Pursuant to 35 U.S.C. § 119(e), this Application claims the benefit of and hereby incorporates by reference for all purposes U.S. Provisional Patent Application Ser. No. 60/495,379 entitled *Wildlife Guard Placement Tool*, naming Lon G. Lee as inventor, filed Aug. 15, 2003.

TECHNICAL FIELD OF THE INVENTION

This invention relates generally to the field of tools used to maintain and repair elevated utility lines and equipment, such as electric power distribution or transmission systems, grids or circuits, and more particularly, but not by way of limitation, to a wildlife guard placement tool for positioning a wildlife guard on energized and elevated electric power equipment, such as an insulator bushing on a transformer.

BACKGROUND OF THE INVENTION

Electrical power outages occur for a number of reasons including severe weather causing damage to the electrical power distribution and/or transmission systems, mechanical failures or wildlife interfering with system components. Most of the causes of outages cannot be prevented and may only be repaired after the outage occurs. Some wildlife associated problems, however, may be preventable.

Squirrels, for example, frequently traverse the elevated electrical power lines and utility poles and may climb onto the lines and equipment, such as the transformers mounted on utility poles to change voltage levels, electrical conductors, capacitors, inductors, switches, relays, surge arresters, insulators (such as porcelain or ceramic insulators). An insulated bushing, for example, may be positioned atop the transformer where the electrical power line connects to the transformer. Unfortunately, a potential difference or voltage exists between the electrical lines and the transformer that may cause an electrical short and electrocute the squirrel if the squirrel simultaneously contacts the transformer and the electrical line. This may damage expensive equipment and cause a localized power outage that may require expensive and time-consuming repairs and extended electrical outages. In other cases, such localized power outages may cascade on the electric power grid and cause more wide-spread and costly electrical outages.

Several devices have been utilized to eliminate or reduce the wildlife problem. A wildlife protection guard, known as the Electrostatic Animal Guard manufactured by 3M, is an example of a device that has been successfully employed for this purpose. The wildlife protection guard, however, is often difficult, dangerous and labor intensive to install on insulators of an energized and elevated electrical power distribution and/or transmission system (hereinafter "distribution system"). Generally, such an installation requires that a utility lineman or line-worker be positioned near and at a height level with the insulator. This requires the worker to either climb the utility pole or be raised by an aerial lift to install each wildlife protection guard, assuming that ground obstructions and/or electrical equipment installations at the site allow for such access. Once at the proper elevation, the worker loads the wildlife protection guard into a straight tool known as a "shotgun-stick." Using the shotgun-stick, the worker stabs the wildlife protection guard onto the insulator, such as the insulated bushing of a transformer, and activates a triggering mechanism on the shotgun-stick to release wildlife protection guard.

The shotgun-stick is, by design, incapable of being used with extendable or telescoping poles, which may be referred to as "extendo-sticks," that extend in length up to 30 feet or so and are commonly employed by line-workers to reach from the ground up to the transformers and electrical lines overhead. Attempts have been made with limited success to fashion tools for attachment to the extendable pole for installing and/or removing the wildlife protection guard from an insulator of a distribution system.

One such attempt included cutting a channel into one end of a block of wood. The block was then taped to a hammer head. A hammer head may be connected to extendable poles and is ordinarily used for replacing blown fuses. The channel in the block of wood would pinch a portion of the wildlife protection guard while the wildlife guard was raised and placed on the insulated bushing on the transformer. This arrangement was unstable, difficult to use and align, and did not adequately support the wildlife protection guard as it was being elevated from the ground.

Another such device, the Animal Guard Applicator, is shown in U.S. Pat. No. 5,794,495 to Anderson. The device disclosed in the Anderson reference proposes to balance the wildlife protection guard on a rake-like structure stabilized with tines. This device appears to be difficult to manufacture, expensive and not particularly easy to use.

SUMMARY OF THE INVENTION

From the foregoing it may be appreciated that a need has arisen for a wildlife guard placement tool. In accordance with the present invention, a wildlife guard placement tool is provided that substantially eliminate one or more of the disadvantages and problems outlined above.

According to an aspect of the present invention, a wildlife guard placement tool for installing a wildlife protection guard on an insulator of an elevated, electrical power distribution system has been provided which comprises a body having a first end, a second end, an opening, a near side, a far side, a first side, and a second side. The opening is operable to receive a portion of a placement tab of the wildlife protection guard through the opening. The far side has a slot formed therein that is operable to receive the portion of the placement tab of the wildlife protection guard through the slot. The first side, located between the near side and the first side has a first notch formed therein. The second side is located opposite the first side and the second side and has a second notch formed therein. The first notch is operable to support a portion of a first side of the placement tab of the wildlife protection guard, and the second notch is operable to support a portion of a second side of the placement tab of the wildlife protection guard.

According to another aspect of the present invention, a wildlife guard placement tool for installing a wildlife protection guard on an insulator of an elevated, electrical power distribution system has been provided. The wildlife guard placement tool comprises having a first end, a second end, an opening, a near side, and a far side with a slot formed therein. The opening and the slot are positioned such that a placement tab of the wildlife protection guard can be received into the opening and out through the slot.

According to yet another aspect of the present invention, a method for placement of a wildlife protection guard on an insulator of an elevated electrical power distribution system has been provided. The method comprises providing a tool for placement of a wildlife protection guard on the insulator of the elevated electrical power distribution system, the tool comprising a body having a first end, a second end, an opening, a near side, and a far side with a slot formed therein; inserting the portion of the placement tab of the wildlife protection guard into the opening and out through the slot such that the wildlife protection guard is retained at least partially by the slot; manipulating the tool such that the wildlife protection guard is substantially adjacent the insulator of the elevated electrical power distribution system; manipulating the extendable pole to retain the wildlife protection guard on the insulator of the elevated electrical power distribution system; and manipulating the extendable pole to withdraw the portion of the placement tab of the wildlife protection guard in the slot in the body of the tool.

The various embodiments and implementations of the present invention provide a profusion of potential technical advantages and benefits. A technical advantage of the present invention may include the capability to may be quickly and safely installed on an insulator of an elevated distribution system that is provided in any number of different positions, even with surrounding foliage and ground obstructions.

Another technical advantage of the present invention may include the capability to easily and inexpensively manufactured.

Yet another technical advantage of the present invention may include the capability to increase safety and reduced labor costs by eliminating additional personnel required to climb utility poles and install such wildlife guards.

Other technical advantages may be readily apparent to one skilled in the art after review of following figures and description, associated herewith.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which:

FIGS. 15–18 illustrate a series of acts or steps to install and/or remove a wildlife guard protector of the present invention using the extendable pole and the wildlife guard placement tool, according to one embodiment of the present invention.

DETAILED DESCRIPTION OF THE INVENTION

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementations illustrated and described herein. Additionally, the drawings contained herein are not necessarily drawn to scale.

Figure 1:
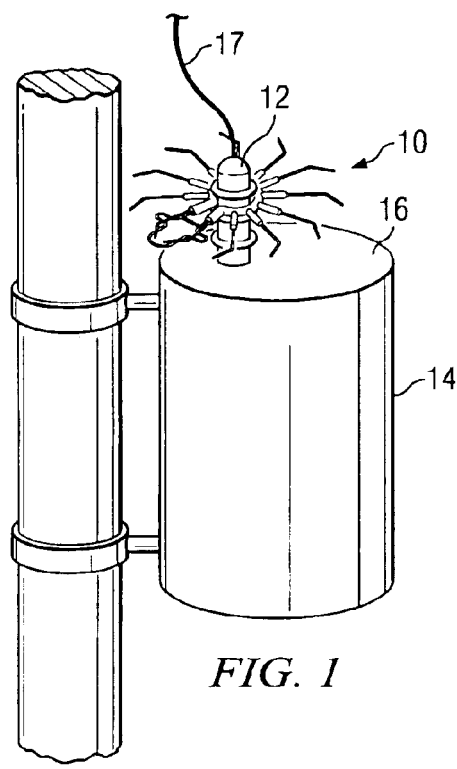
FIG. 1 is a perspective view of a wildlife protection guard.
Figure 2:
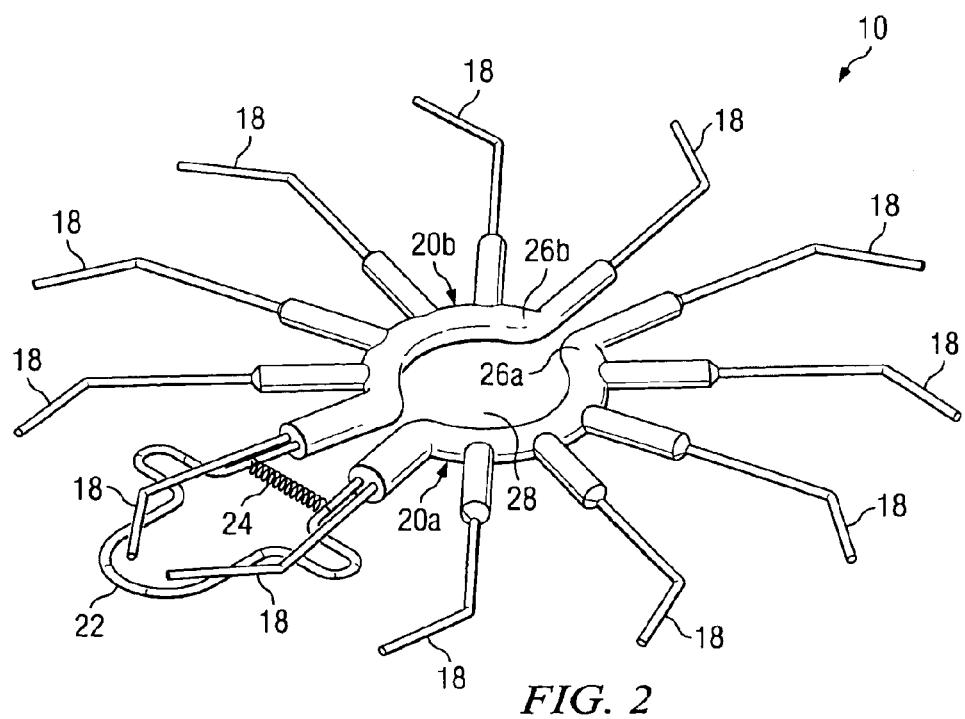
FIG. 2 is a perspective view of the wildlife protection guard shown installed on an insulated bushing on a transformer.

FIG. 1 and FIG. 2 illustrate a wildlife protection guard or wildlife guard 10, which may be manufactured by or sold by the 3M Company under the name Electrostatic Animal Guard, and may be installed on an insulator of an elevated, electrical power distribution system, such as an insulated bushing 12 provided on a transformer 14 as shown in FIG. 2. The wildlife protection guard 10 prevents an animal, such as a squirrel, from contacting a top 16 of the transformer 14 and a conductor 17 or other conductors above the insulated bushing 12 that are connected to an energized electrical line of the elevated, electrical power distribution system. The wildlife protection guard 10 is useful in preventing the animals from being harmed, as well as preventing damage to the electrical distribution system caused by such a short circuit, and preventing system blackouts or brownouts to increase overall system reliability. This also reduces the number of service calls, which results in substantial savings to electric utility companies and/or energy delivery companies responsible for operating and maintaining a transmission and distribution system.

The wildlife protection guard 10 is provided with a plurality of wires 18 extending from a pair of semi-circular insulated members 20a and 20b. The insulated members 20a and 20b are connected to one another by a connecting wire or placement tab 22. In one embodiment, a spring 24 is connected near the ends or sides of the placement tab 22 where the placement tab 22 is attached to the insulated members 20a and 20b. The spring 24 connected to the placement tab 22 in this manner causes the insulated members 20a and 20b to be biased toward one another in a clamping manner.

The wildlife protection guard 10 is forced or pushed about the insulated bushing 12 near a connection point 26a and 26b of the insulated members 20a and 20b, respectively. The insulated members 20a and 20b expand to receive the insulated bushing 12 within the opening 28 defined by the insulated members 20a and 20b. The insulated bushing 12 is received in the opening 28 of the wildlife protection guard 10 and the overall configuration of the wildlife protection guard 10 promotes a resilient clamping engagement of the insulated members 20a and 20b about the insulated bushing 12.

When the wildlife protection guard 10 is placed about the insulated bushing 12, the plurality of wires 18 of the wildlife protection guard 10 are believed to become electrostatically charged under certain conditions. An animal, such as a squirrel, attempting to move from the top 16 of the transformer 14 to the conductor 17 connected to the insulated bushing 12 will likely contact the plurality of wires 18 of the wildlife protection guard 10 and receive a mild deterring electrical shock preventing the animal from simultaneously contacting the wire 18 and the top 16 of the transformer 14. It can be seen that this configuration of wildlife protection guard 10 is useful to prevent harm to animals, such as squirrels, prevent damage to the transformer 14 from such short circuits, and enhance overall distribution system reliability.

Figure 3:
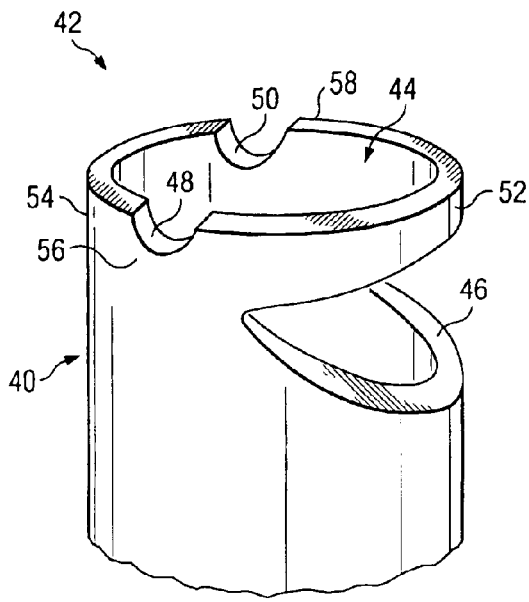
FIG. 3 is a perspective view that illustrates one configuration of a second end of a body of the wildlife guard placement tool of the present invention.

FIG. 3 is a perspective view that illustrates one configuration of a second end 40 of a body 42 of the wildlife guard placement tool of the present invention. The second end 40 includes an opening 44, a slot 46 positioned at a far side 52, which is opposite from a near side 54, of the second end 40. The second end 40 also includes a first notch 48 at a first side 56, and a second notch 50 at a second side 58. The slot 46, the first notch 48 and the second notch 50 are operable to support a placement tab of a wildlife protection guard for installation on (and removal from) an insulator of a distribution system using an extendable pole, described more fully below and illustrated in various other figures. It should be appreciated that the size, shape and placement of the slot 46, the first notch 48 and the second notch 50 may be varied depending on various factors understood by one skilled in the art. For example, in one embodiment, the depth of the first notch 48 and the second notch 50 may be around a quarter of an inch, and the width and depth of the slot 46 may be ⅝ of an inch and one-half of an inch, respectively. Depending on various factors, including how the wildlife protection guard will be positioned, the relationship between the bottom of the first notch 48 and the second notch 50 and the top of the slot 46 may be configured to provide a desired position of the wildlife protection guard when the retaining tab is positioned in the first notch 48, the second notch 50 and the slot 46. The body 42 may be constructed from a variety of materials including, but not limited to, insulating or non-conductive materials, such as polymeric materials, fiberglass, wood and a variety of other known and/or available materials. Although the body 42 is preferably made of an electrically non-conductive material, it can also be made of a conductive material, such as a metal.

Figure 4:
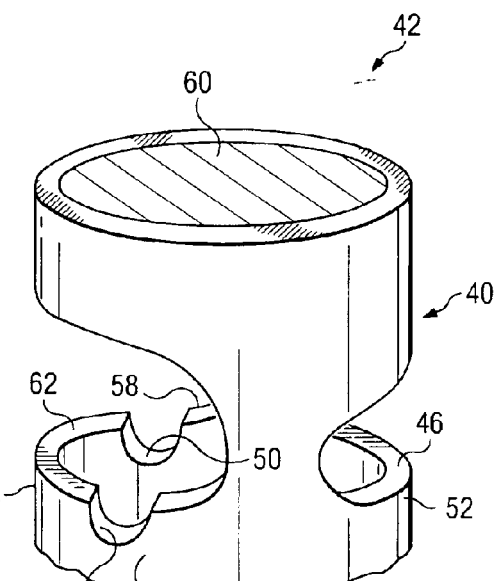
FIG. 4 is a perspective view that illustrates another configuration of the second end of the body of the wildlife guard placement tool of the present invention.

FIG. 4 is a perspective view that illustrates another configuration of the second end 40 of the body 42 of the wildlife guard placement tool of the present invention. The second end 40 includes a slot 46 positioned at a far side 52, which is opposite from a near side 54, of the second end 40. The second end 40 also includes a first notch 48 at a first side 56, and a second notch 50 at a second side 58. The first notch 48 and the second notch 50 are formed through or as part of a second slot 62 positioned near or adjacent the second end 40. A cross-hatching 60 is shown at the far end of the second end 40 to represent the fact that the body 42 may be a solid material or a hollowed-out material. The slot 46, the first notch 48 and the second notch 50 are operable to support a placement tab (e.g., placement tab 22) of a wildlife protection guard for installation on an insulator of a distribution system using an extendable pole, described more fully below and illustrated in various other figures. It should appreciated that the size, shape and placement of the slot 46, the second slot 62, the first notch 48 and the second notch 50 may be varied depending on various factors understood by one skilled in the art.

Figure 5:
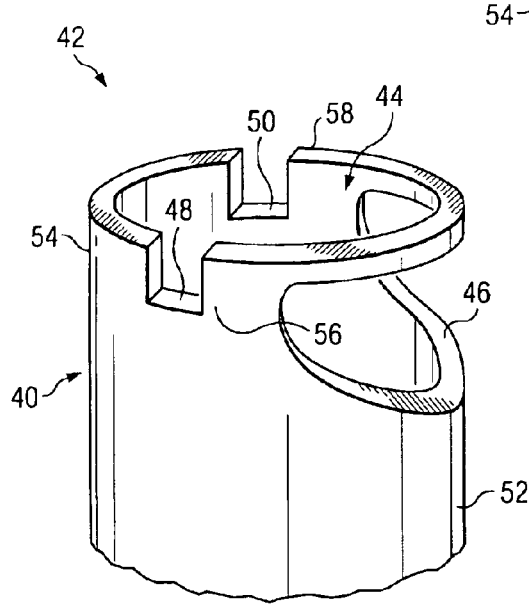
FIG. 5 is a perspective view that illustrates yet another configuration of the second end of the body of the wildlife guard placement tool of the present invention.

FIG. 5 shows yet another configuration of the second end 40 of the body 42 of the wildlife guard placement tool, similar to that illustrated in FIG. 1. The body 42 may be constructed out of virtually any available material, but is shown in this embodiment being fabricated using a PVC pipe. Other materials can include, but are not limited to, poly pipe and the like. Other materials will become apparent to one of ordinary skill in the art. The diameter of the opening 44 may be any diameter that can serve to support a placement tab or other member of a wildlife protection guard, but is preferably from in the range including a quarter of an inch to three inches. The length of the body 42, similarly, may vary significantly and may be virtually any length that can function to install a wildlife protection guard. For example, the length of the body 42 may extend, preferably and without limitation, from three inches to three feet.

Figure 6:
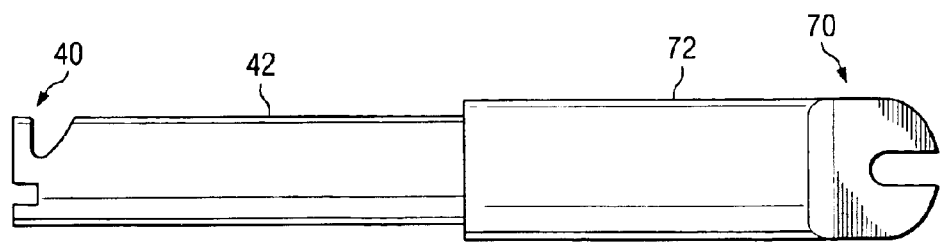
FIG. 6 is a perspective view of a configuration of a second end and a first end of the body of the wildlife guard placement tool of the present invention.
Figure 7:
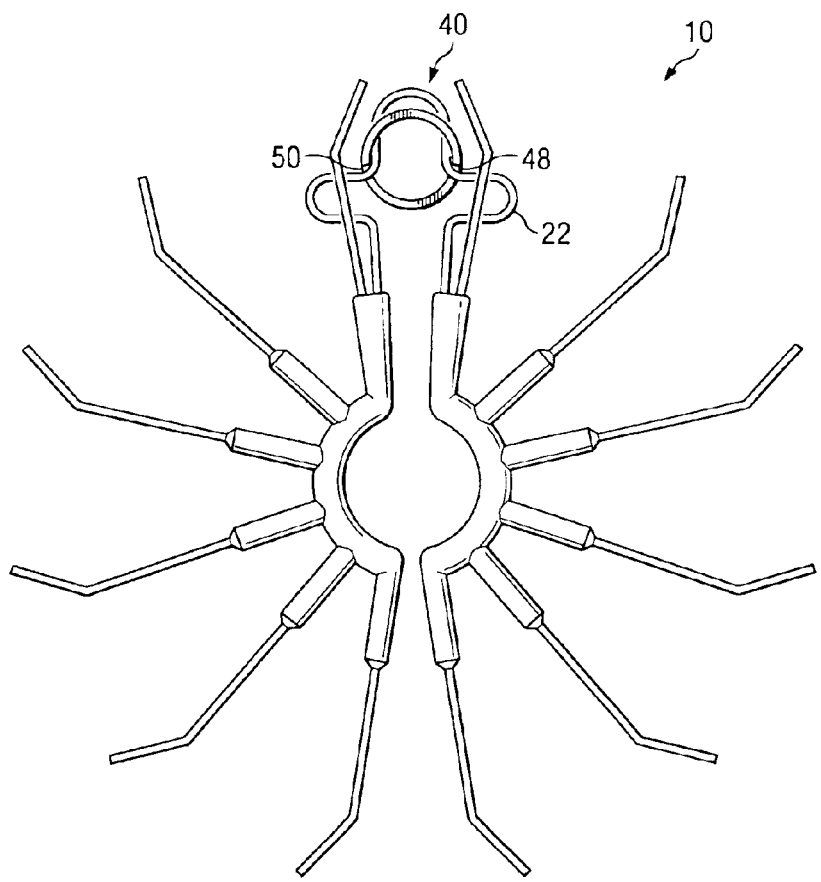
FIGS. 7–12 show various configurations that illustrate a mating or positioning of a portion of a placement tab, such as the placement tab shown in FIG. 1, of a wildlife protection guard positioned at or near the second end of the body of the tool using the slot, the first notch and the second notch.
Figure 8:
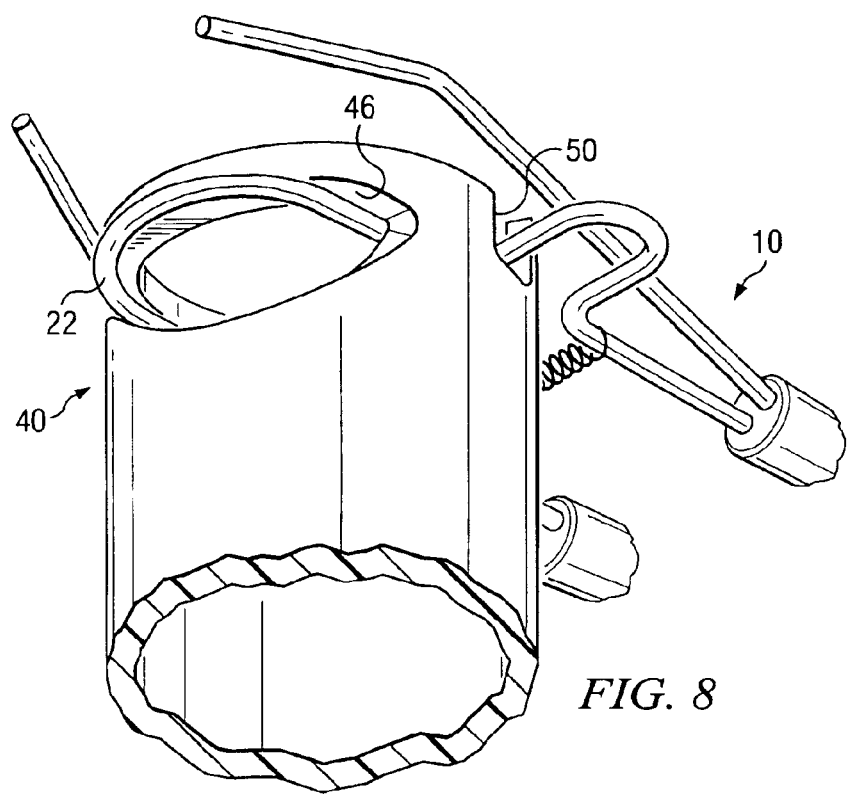
Figure 9:
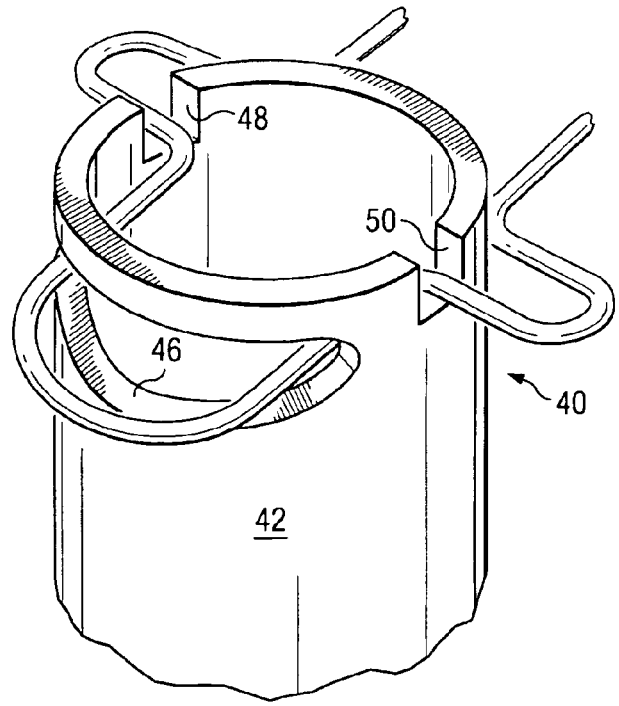

FIG. 6 shows another configuration of the body 42 and further illustrates a first end 70 with a connector 72 provided at or adjacent the first end 70 of the body 42. The connector 72 may be any known or available connector but is illustrated, in the configuration of FIG. 6, as a universal type connector that may mate or pivotally connect with an extendable or elongated pole, such as an extendo-stick or hot-stick. These poles or sticks may be telescoping and are used by electrical line workers to perform various tasks.

FIGS. 7–12 illustrate in various configuration, a general mating or positioning of a portion of a placement tab (e.g., the placement tab 22 shown in FIG. 1) of a wildlife protection guard positioned at or near the second end 40 of the body 42 using the slot 46, the first notch 48 and the second notch 50. In certain configurations of the present invention, the wildlife protection guard is securely retained or positioned so that it may be raised and installed on an insulator or other equipment, as desired, of an elevated, distribution system. The shape, size and positioning of the slot 46, the first notch 48 and the second notch 50, and in other configurations the second slot 62, may be varied to obtain a desired position of the wildlife protection guard, such as the profile of FIG. 18, which illustrates the wildlife protection guard being slightly upwardly tilted with respect to the body 42.

Figure 10:
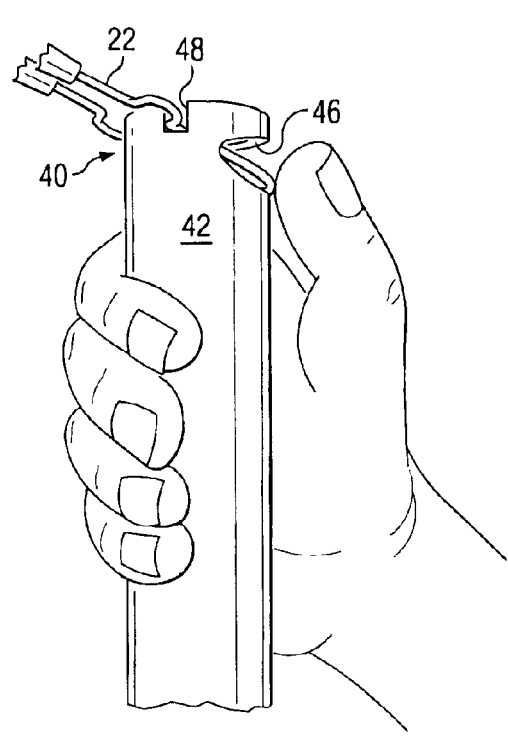
Figure 11:
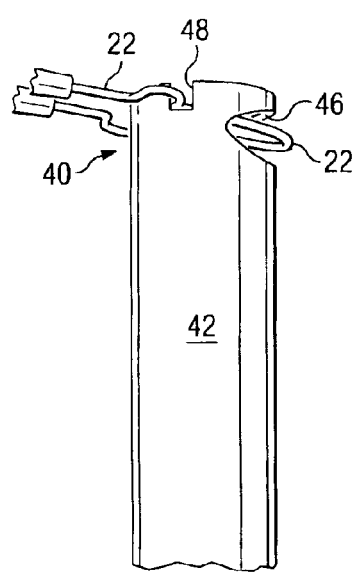

FIGS. 10 and 11 illustrate the fact that, in certain configurations, the wildlife protection guard is securely positioned such that it might be pushed downwardly or upwardly, yet still remain positioned to the body or tool 42. This is especially important when attempting to install a wildlife protection guard in an area with heavy brush or growth that might push against the wildlife protection guard as it is being raised to be installed on the elevated distribution system.

Figure 12:
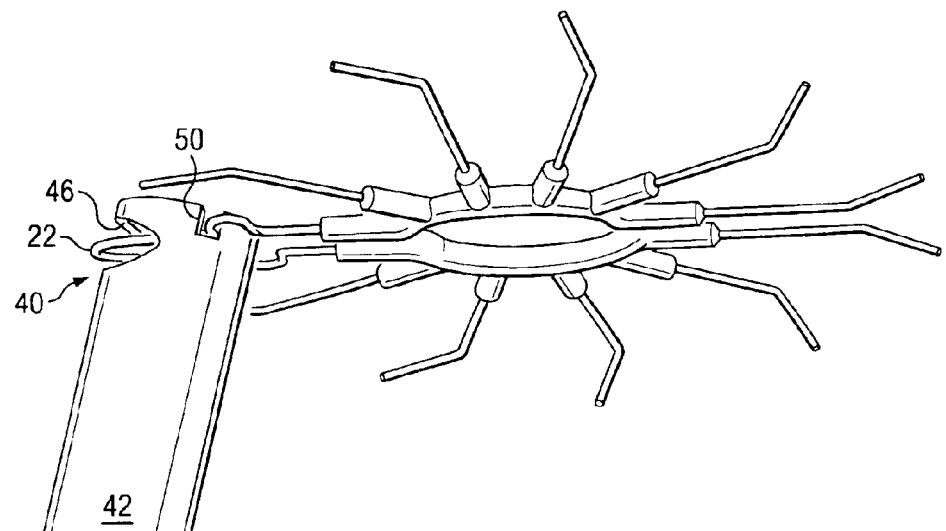
Figure 12:
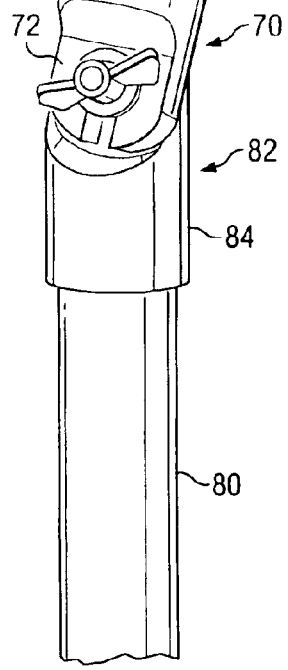

FIG. 12 illustrates a second end 82 of an extendable pole 80 that connects to the connector 72 of the first end 70 of the body 42 through a connector 84 of the extendable pole 80. The combination of the connector 72 and the connector 84 are illustrated as an adjustable, universal connector that may be aligned, using a wing bolt or nut, to adjust the body 42 such that it is generally in line with the body of the extendable pole 80 or at any desired angle in which the body 42 is not in line (e.g., out of line with the body of the extendable pole 80).

Figure 13:
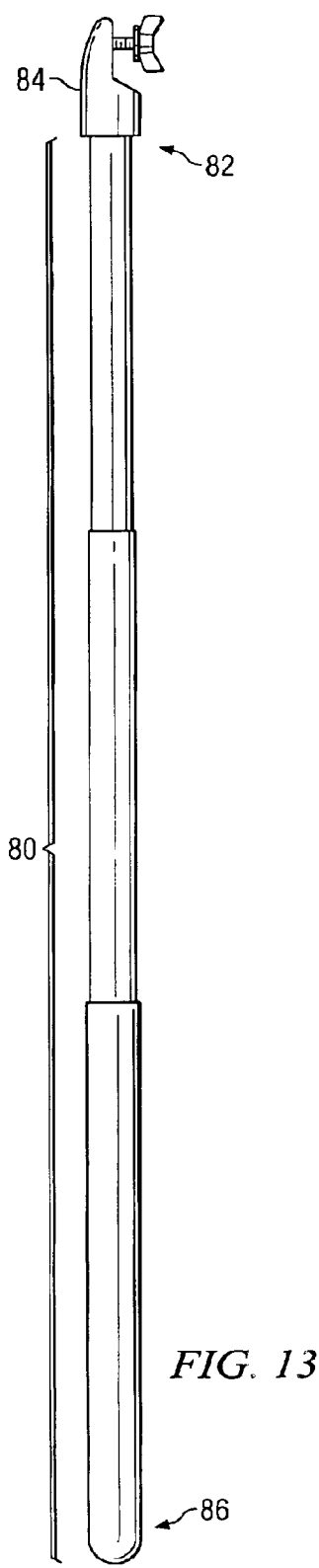
FIGS. 13 and 14 illustrate one configuration of an extendable pole, utilized in various configurations of the invention.
Figure 14:
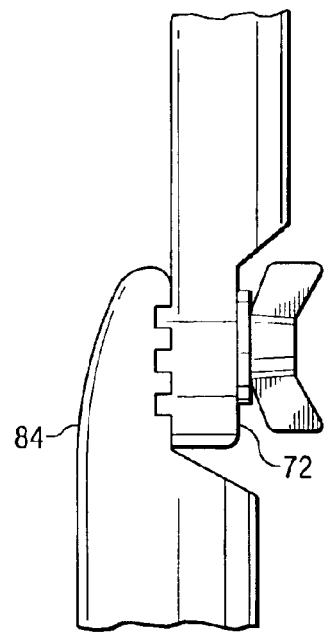
Figure 15:
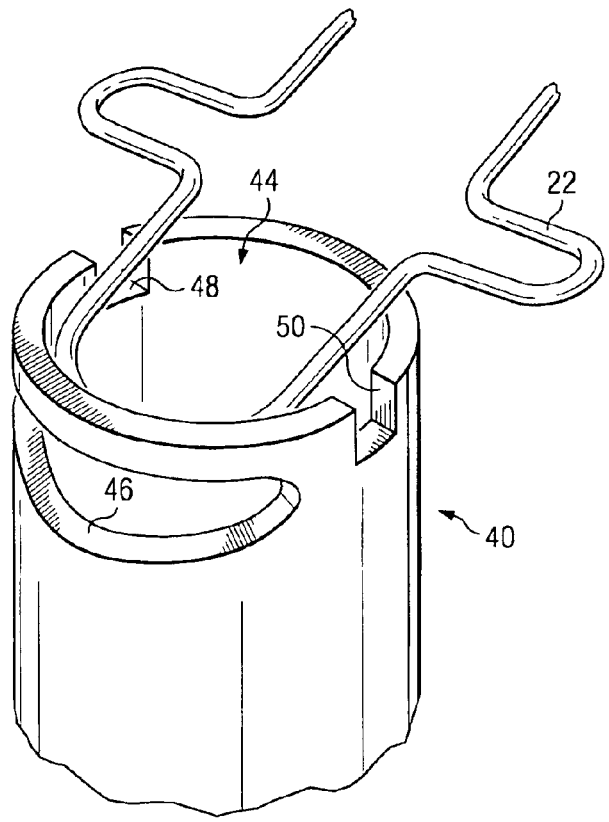
Figure 16:
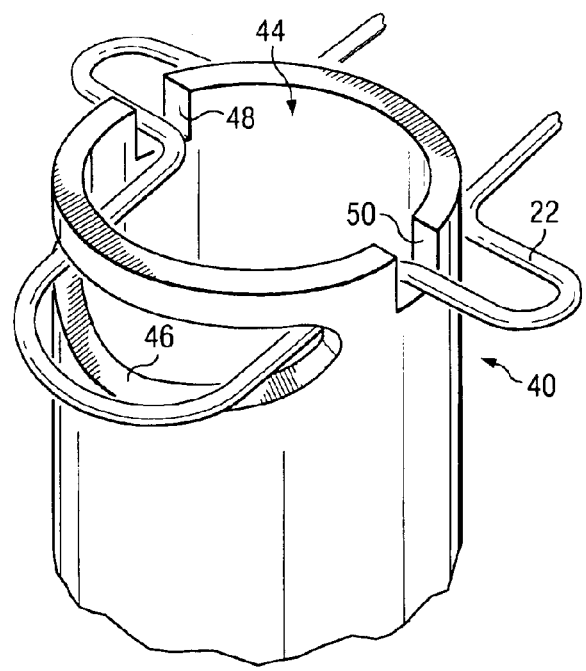

FIGS. 13 and 14 illustrate the extendable pole 80, the connector 84 at the second end 82 of the extendable pole 80, along with the mating of the connector 84 with the connector 72 of the body 42. FIG. 13 generally shows the extendable pole 80, along with a first end 86 that is operable to be held when installing a wildlife guard protector on an elevated distribution system. The extendable pole 80 is a well-known tool capable of extending from 6 to 30 feet to allow the worker to reach from the ground up to equipment, such as a transformer of the elevated distribution system, and is generally constructed of a nonconductive material. FIG. 12 shows the mating connection of the connector 84 and the connector 72.

FIGS. 15–18 illustrate a series of acts or steps in a method of installing and/or removing a wildlife guard protector of the present invention using the extendable pole 80 and the wildlife guard placement tool, according to one aspect of the invention. The method can generally include initially providing a tool for placement of a wildlife protection guard (e.g., wildlife protection guard 10) on the insulator of the elevated electrical power distribution system. The tool can include any of a variety of configurations including, but not limited to, the configurations described above with reference to FIGS. 3–12. As an example, intended for illustrated purposes only, the tool can include a body 42 made of a material that is considered electrically non-conductive. The body can include a first end 70 and a second end 40 and have a connector 72 positioned on the first end 70. The second end 40 of the tool can include an opening 44, a near side 54, and a far side 52 with a slot 46 formed in the far side 52. The opening 44 can generally be operable to receive a portion of the placement tab (e.g., placement tab 22) of the wildlife guard and the slot 46 can generally be operable to receive the portion of the placement tab (e.g., placement tab 22) of the wildlife protection guard through the slot 46. The body 42 can further include a first side 56 located between the near side 54 and the far side 52, the first side 56 having a first notch 48 formed therein, and a second side 58 located opposite the first side 56, the second side 58 having a second notch 50 formed therein. The first notch 48 can be operable to support a portion of the first side of the placement tab of the wildlife protection, and the second notch 50 can be operable to support a portion of the second side of the placement tab (e.g., placement tab 22) of the wildlife protection guard.

The method continues with providing an extendable pole 80 (e.g., similar to the extendable pole 80 of FIG. 13) having a first end 86 operable to be held by a user, and a second end 82 with a connecter 84 that is operable to pivotally connect to the connector 72 of the first end 70 of the body 42 of the tool to position the body 42 substantially in line with the extendable pole 80 or substantially not in line with the extendable pole 80. The method may further include inserting the portion of the placement tab (e.g., placement tab 22) of the wildlife protection guard in the slot 46 in the body 42 of the tool such that the wildlife protection guard is retained by the tool at least partially through the first notch 48 and the second notch 50 of the body 42 of the tool. The extendable pole 80 may be manipulated such that the wildlife protection guard is substantially adjacent the insulator or insulated bushing 12 of the elevated electrical power distribution system, and is then retained on the insulator or insulated bushing 12 of the elevated electrical power distribution system. Finally, the extendable pole 80 is withdrawn such that the portion of the placement tab (e.g., placement tab 22) of the wildlife protection guard in the slot 46 in the body 42 of the tool is released so the wildlife protection guard is installed.

A method of removing the wildlife protection guard generally includes a reversal of the latter of the above steps—e.g., the extendable pole 80 and body 42 of the tool are placed adjacent the insulator or insulated bushing 12 with wildlife guard attached thereto. The tool engages the tab of the wildlife guard—e.g., the first notch 48 engages a portion of the first side of the placement tab of the wildlife protection and the second notch 50 engages a portion of the second side of the placement tab (e.g., placement tab 22) and the wildlife guard is freed from the insulated bushing 12. It will be appreciated, as previously mentioned, that frequently foliage and barriers interfere with the placement and removal of a wildlife protection guard. Thus, it is necessary to be able to remove the wildlife protection guard in a manner that allows the worker to maintain control of the wildlife protection guard until it reaches the ground. Otherwise, the wildlife protection guard may become dislodged and become stuck in a tree or other foliage or may land on the other side of a barrier, such as a fence, where it may not be retrievable.

Thus, it is apparent that there has been provided, in accordance with the present invention, a wildlife guard placement tool that satisfies one or more of the advantages set forth above. Although the preferred embodiment has been described in detail, it should be understood that various changes, substitutions, and alterations can be made herein without departing from the scope of the present invention, even if all of the advantages identified above are not present. For example, the various elements or components may be combined or integrated in another system or certain features may not be implemented.

Also, the techniques, systems, sub-systems, and methods described and illustrated in the preferred embodiment as discrete or separate may be combined or integrated with other systems, modules, techniques, or methods without departing from the scope of the present invention. Other items shown as directly coupled to each other may be coupled through some other interface or device, such that the items may no longer be considered directly coupled to each other but may still be in communication with one another. Other examples of changes, substitutions, and alterations are readily ascertainable by one skilled in the art and could be made without departing from the spirit and scope of the present invention.

What is claimed is:

1. A wildlife guard placement tool for installing a wildlife protection guard on an insulator of an elevated, electrical power distribution system, the tool comprising:
    a body having:
        a first end,
        a second end,
        an opening operable to receive a portion of a placement tab of the wildlife protection guard through the opening,
        a near side,
        a far side with a slot formed therein, the slot operable to receive the portion of the placement tab of the wildlife protection guard through the slot,
        a first side located between the near side and the far side, the first side having a first notch formed therein, and
        a second side located opposite the first side, the second side having a second notch formed therein, wherein the first notch is operable to support a portion of a first side of the placement tab of the wildlife protection guard, and wherein the second notch is operable to support a portion of a second side of the placement tab of the wildlife protection guard.

2. The wildlife guard placement tool of claim 1, further comprising:
    an extendable pole having a first end operable to be held by a user, and a second end with a connecter that is pivotally connected to a connector of the first end of the body.

3. The wildlife guard placement tool of claim 2, wherein the pivotal connection between the connector on the second end of the extendable pole and the connector on the first end of the body positions the body substantially in line with the extendable pole.

4. The wildlife guard placement tool of claim 2, wherein the pivotal connection between the connector on the second end of the extendable pole and the connector on the first end of the body positions the body substantially not in line with the extendable pole.

5. The wildlife guard placement tool of claim 1, wherein the opening, slot, first notch, and second notch are positioned adjacent the second end.

6. The wildlife guard placement tool of claim 1, further comprising:
   a connector positioned on the first end of the body.

7. The wildlife guard placement tool of claim 1, wherein the opening is round.

8. The wildlife guard placement tool of claim 1, wherein the body is made of a non-conductive material.

9. The wildlife guard placement tool of claim 1, wherein the body is cylindrically shaped.

10. A wildlife guard placement tool for installing a wildlife protection guard on an insulator of an elevated, electrical power distribution system, the tool comprising:
    a body having a first end, a second end, an opening, a near side, and a far side with a slot formed therein extending through the body to the opening, wherein the opening and the slot are positioned such that a placement tab of the wildlife protection guard can be received into the opening and out through the slot.

11. The wildlife guard placement tool of claim 10, wherein the opening is round.

12. The wildlife guard placement tool of claim 10, wherein the body further comprises:
    a first side located between the near side and the far side, the first side having a first notch formed therein, and
    a second side located opposite the first side, the second side having a second notch formed therein, wherein the first notch is operable to support a portion of a first side of the placement tab of the wildlife protection guard, and wherein the second notch is operable to support a portion of a second side of the placement tab of the wildlife protection guard.

13. The wildlife guard placement tool of claim 12, wherein the opening, slot, first notch, and second notch are positioned adjacent the second end.

14. The wildlife guard placement tool of claim 10, further comprising:
    a connector positioned on the first end of the body.

15. The wildlife guard placement tool of claim 10, wherein the slot has a width that coincides with a width of the placement tab of the wildlife protection guard.

16. The wildlife guard placement tool of claim 10, wherein the body is made of a non-conductive material.

17. The wildlife guard placement tool of claim 10, wherein the body is cylindrically shaped.

18. A method for placement of a wildlife protection guard on an insulator of an elevated electrical power distribution system, the method comprising:
    providing a tool for placement of a wildlife protection guard on the insulator of the elevated electrical power distribution system, the tool comprising:
       a body having a first end, a second end, an opening, a near side, and a far side with a slot formed therein extending through the body to the opening;
    inserting a portion of a placement tab of the wildlife protection guard into the opening and out through the slot such that the wildlife protection guard is retained at least partially by the slot;
    manipulating the tool such that the wildlife protection guard is substantially adjacent the insulator of the elevated electrical power distribution system;
    manipulating the tool to retain the wildlife protection guard on the insulator of the elevated electrical power distribution system; and
    manipulating the tool to withdraw the portion of the placement tab of the wildlife protection guard in the slot in the body of the tool.

19. The method of claim 18, wherein the tool further comprises a first side located between the near side and the far side, the first side having a first notch formed therein, and a second side located opposite the first side, the second side having a second notch formed therein, further comprising:
    inserting a first side of the placement tab of the wildlife protection guard into the first notch, during the insertion of the portion of the placement tab of the wildlife protection guard into the opening; and
    inserting a second side of the placement tab of the wildlife protection guard into the second notch, during the insertion of the portion of the placement tab of the wildlife protection guard into the opening.

20. The method of claim 18, further comprising:
    providing an extendable pole having a first end operable to be held by a user and a second end with a connector; and
    pivotably connecting the connector of the second end of the extendable pole to a connector on the first end of the body.

21. The method of claim 20, wherein the pivotal connection brings the body substantially in line with the pole.

22. The method of claim 20, wherein the pivotal connection brings the body substantially not in line with the pole.

* * * * *